(12) United States Patent
Honda

(10) Patent No.: US 9,117,283 B2
(45) Date of Patent: Aug. 25, 2015

(54) IMAGE PROCESSING APPARATUS, IMAGE PROCESSING METHOD, AND COMPUTER-READABLE, NON-TRANSITORY MEDIUM

(71) Applicant: PFU LIMITED, Kahoku-shi, Ishikawa (JP)

(72) Inventor: Keiji Honda, Kahoku (JP)

(73) Assignee: PFU Limited, Kahoku-shi (JP)

(*) Notice: Subject to any disclaimer, the term of this patent is extended or adjusted under 35 U.S.C. 154(b) by 72 days.

(21) Appl. No.: 14/095,631

(22) Filed: Dec. 3, 2013

(65) Prior Publication Data
US 2014/0212049 A1    Jul. 31, 2014

(30) Foreign Application Priority Data
Jan. 30, 2013    (JP) .................................. 2013-016094

(51) Int. Cl.
G06K 9/48    (2006.01)
G06T 7/00    (2006.01)
G06K 9/36    (2006.01)

(52) U.S. Cl.
CPC ............... *G06T 7/0085* (2013.01); *G06K 9/36* (2013.01); *G06T 2207/20136* (2013.01); *G06T 2207/30176* (2013.01)

(58) Field of Classification Search
CPC ....................................................... G06T 7/00
USPC ....................................................... 382/199
See application file for complete search history.

(56) References Cited

U.S. PATENT DOCUMENTS

2004/0131256 A1*   7/2004   Fujieda et al. ................ 382/199
2013/0182002 A1*   7/2013   Macciola et al. ............. 345/589

FOREIGN PATENT DOCUMENTS

| JP | 9-172534 | 6/1997 | |
| JP | 2000-354150 | 12/2000 | |
| WO | WO 2014/109708 A1 * | 7/2014 | ............... G06T 7/60 |

OTHER PUBLICATIONS

Yun-Seok Lee et al., Mar. 30, 2006, A straight line detection using principal component analysis, ScienceDirect, Retrieved from Internet on Apr. 23, 2015. Retrieved from <URL:http://physics.lbl.gov/patrecog/images/A_straight_line_detection_using_principal_component_analysis.pdf>.*

(Continued)

*Primary Examiner* — Gregory F Cunningham
(74) *Attorney, Agent, or Firm* — Christie, Parker & Hale, LLP

(57) ABSTRACT

Provided are an image processing apparatus, image processing method and a computer-readable, non-transitory medium that can accurately detect document edges from a readout image. The image processing apparatus includes a first edge pixel detector for detecting a plurality of first edge pixels from an input image, a straight line detector for detecting a straight line from the first edge pixels, a classifying module for classifying the first edge pixels into on-line edge pixels and non-on-line edge pixels, a second edge pixel detector for detecting second edge pixels located between two of the on-line edge pixels, when there is any one of the non-on-line edge pixels between two of the on-line edge pixels, and a determining module for determining whether the non-on-line edge pixel represents a document edge, based on whether the two on-line edge pixels are connected by the second edge pixels via the non-on-line edge pixel.

11 Claims, 12 Drawing Sheets

(56) References Cited

OTHER PUBLICATIONS

Renate Bartl et al., 1996, ("Image Map-Fusion Based on Line Segment Matching"), Retrieved from the Internet on Apr. 23, 2015, Retreived from <URL:http://www.isprs.org/proceedings/XXXI/congress/part4/117_XXXI-part4.pdf>.*

* cited by examiner

IMAGE PROCESSING APPARATUS, IMAGE PROCESSING METHOD, AND COMPUTER-READABLE, NON-TRANSITORY MEDIUM

CROSS-REFERENCE TO RELATED APPLICATIONS

This application is based upon and claims the benefit of priority of prior Japanese Patent Application No. 2013-016094, filed on Jan. 30, 2013, the entire contents of which are incorporated herein by reference.

TECHNICAL FIELD

Embodiments discussed in the present specification relate to image processing technology.

BACKGROUND

When reading a document using an image reading apparatus, image copying apparatus, or the like, if an edge portion of the document is folded or torn, the document backing surface will show up in such an edge portion when the document is read. If, for example, the background color of the document is different from the color of the document backing surface, the region in the stored image data or copied document where the document backing surface shows up can become distracting to the eye. If such region are to be corrected, document edges must be accurately detected from the readout image.

There is disclosed an image editing apparatus that detects solid black portions in image data read from a document image, and that, if there is any solid black portion in the position specified by the user using a specifying means, then erases the solid black portion (refer to Japanese Laid-open Patent Publication No. 9-172534).

There is also disclosed an image processing apparatus that detects black frame regions at both ends of a readout document and removes the black frame regions. This image processing apparatus holds image data of the readout document on a line-by-line basis, and detects a continuous black pixel region continuing from the reading start position, with provisions made to reset any previously detected black pixels each time a white pixels appears, and then detects the finally left continuous black pixel region (refer to Japanese Laid-open Patent Publication No. 2000-354150).

SUMMARY

If content, such as a character or a graphic, whose gray level is about the same as that of the document backing surface is located near a document edge, the image processing apparatus may erroneously detect such content as being a document edge. In this case, the image processing apparatus may accidentally erase the content on the document by trying to correct the region outside the document.

Accordingly, it is an object of the present invention to provide an image processing apparatus and image processing method that can accurately detect document edges from a readout image, and a computer-readable, non-transitory medium storing a computer program for causing a computer to implement such an image processing method.

According to an aspect of the apparatus, there is provided an image processing apparatus. The image processing apparatus includes a first edge pixel detector for detecting a plurality of first edge pixels from an input image, a straight line detector for detecting a straight line from the plurality of first edge pixels, a classifying module for classifying the plurality of first edge pixels into on-line edge pixels which are located within a predetermined distance from the straight line and non-on-line edge pixels which are not located within the predetermined distance, a second edge pixel detector for detecting second edge pixels located between two of the on-line edge pixels, when there is any one of the non-on-line edge pixels between two of the on-line edge pixels, and a determining module for determining whether the non-on-line edge pixel represents a document edge or not, based on whether or not the two on-line edge pixels are connected by the second edge pixels via the non-on-line edge pixel.

According to an aspect of the method, there is provide an image processing method. The image processing method includes detecting a plurality of first edge pixels from an input image, detecting a straight line from the plurality of first edge pixels, classifying the plurality of first edge pixels into on-line edge pixels which are located within a predetermined distance from the straight line and non-on-line edge pixels which are not located within the predetermined distance, detecting second edge pixels located between two of the on-line edge pixels when there is any one of the non-on-line edge pixels between two of the on-line edge pixels, and determining, by a computer, whether the non-on-line edge pixel represents a document edge or not, based on whether or not the two on-line edge pixels are connected by the second edge pixels via the non-on-line edge pixel.

According to an aspect of the computer-readable, non-transitory medium storing a computer program, the computer program causes a computer to execute a process, including detecting a plurality of first edge pixels from an input image, detecting a straight line from the plurality of first edge pixels, classifying the plurality of first edge pixels into on-line edge pixels which are located within a predetermined distance from the straight line and non-on-line edge pixels which are not located within the predetermined distance, detecting second edge pixels located between two of the on-line edge pixels when there is any one of the non-on-line edge pixels between two of the on-line edge pixels, and determining whether the non-on-line edge pixel represents a document edge or not, based on whether or not the two on-line edge pixels are connected by the second edge pixels via the non-on-line edge pixel.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, an image processing apparatus, an image processing method, and computer program according to an embodiment, will be described with reference to the drawings. However, note that the technical scope of the invention is not limited to these embodiments and extends to the inventions described in the claims and their equivalents.

Figure 1:
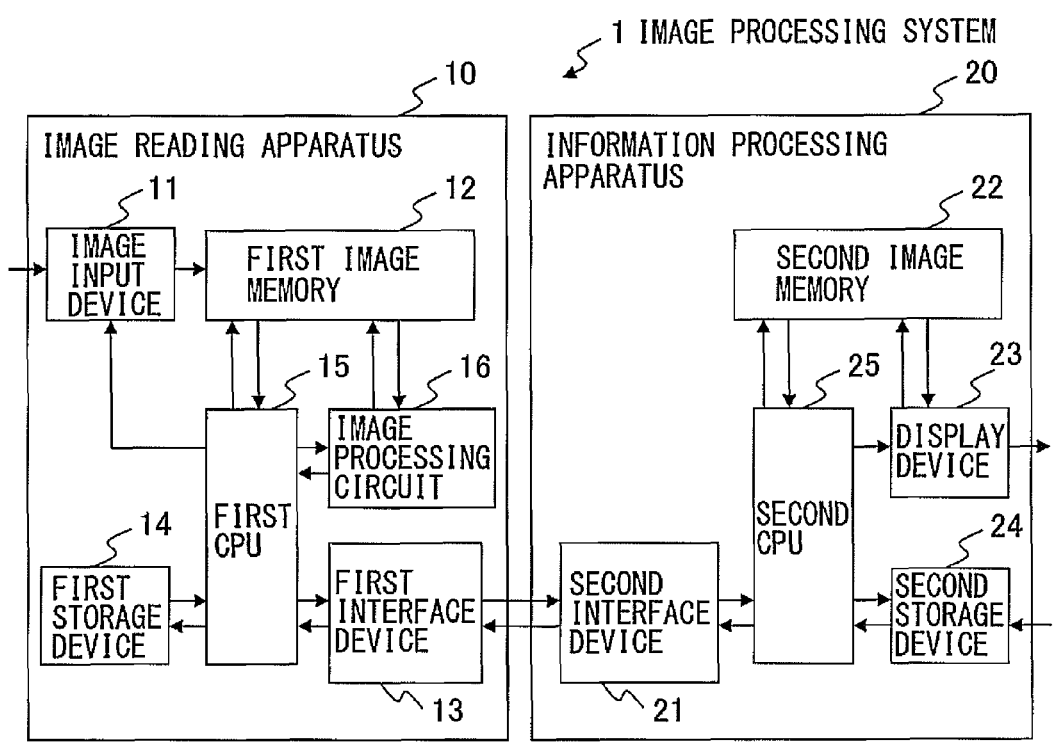
FIG. 1 is a diagram showing the hardware configuration of an image processing system according to an embodiment.

FIG. 1 is a diagram showing the hardware configuration of an image processing system according to an embodiment. As shown in FIG. 1, the image processing system 1 comprises an image reading apparatus 10 and an information processing apparatus 20. The image reading apparatus 10 is, for example, an image scanner, a digital camera, or the like, and the information processing apparatus 20 is, for example, a personal computer or the like which is connected to the image reading apparatus 10 for use.

The image reading apparatus 10 includes an image input device 11, a first image memory 12, a first interface device 13, a first storage device 14, a first CPU 15, and an image processing circuit 16. The component elements of the image reading apparatus 10 will be described in detail below.

The image input device 11 includes an image sensor for capturing an image of a subject such as a document, a scene, a person, or the like. The following description will be given by assuming that the subject whose image is to be captured is a document. The image sensor includes imaging devices, such as CCD or CMOS devices, arranged in a one-dimensional or two-dimensional array, and optics for focusing the image of the subject onto the imaging devices. Each imaging device outputs an analog value corresponding to each RGB color. The image input device 11 generates pixel data by converting each of the analog values output from the image sensor into a digital value, and generates image data (hereinafter referred to as the RGB image) constructed from the pixel data. The RGB image provides color image data represented by a total of 24 bits of RGB values with each pixel data represented by 8 bits for each RGB color.

Then, the image input device 11 generates an image (hereinafter referred to as the input image) by converting the RGB value of each pixel in the RGB image into a luminance value and a color difference value (YUV values), and stores the input image in the first image memory 12. The YUV values can be calculated, for example, from the following equations.

$$Y \text{ value} = 0.30 \times R \text{ value} + 0.59 \times G \text{ value} + 0.11 \times B \text{ value} \quad (1)$$

$$U \text{ value} = -0.17 \times R \text{ value} - 0.33 \times G \text{ value} + 0.50 \times B \text{ value} \quad (2)$$

$$V \text{ value} = 0.50 \times R \text{ value} - 0.42 \times G \text{ value} - 0.08 \times B \text{ value} \quad (3)$$

The first image memory 12 includes a storage device such as a nonvolatile semiconductor memory, a volatile semiconductor memory, a magnetic disk, or the like. The first image memory 12 is connected to the image input device 11 and stores the input image generated by the image input device 11; the first image memory 12 is also connected to the image processing circuit 16 and stores various kinds of processed images that the image processing circuit 16 produced by applying image processing operations to the input image.

The first interface device 13 includes an interface circuit conforming to USB or other serial bus architecture, and is electrically connected to the information processing apparatus 20 for transmission and reception of image data and various kinds of information. Further, a flash memory or the like may be connected to the first interface device 13 so that the image data stored in the first image memory 12 may be transferred to the flash memory for storage.

The first storage device 14 includes a memory device such as a RAM (Random Access Memory) or ROM (Read Only Memory), a fixed disk device such as a hard disk, or a removable storage device such as a flexible disk or an optical disk. The first storage device 14 stores a computer program, database, table, etc., which are used in the image reading apparatus 10 for various processing operations. The computer program may be installed on the storage device 14 from a computer-readable, non-transitory medium such as a compact disk read only memory (CD-ROM), a digital versatile disk read only memory (DVD-ROM), or the like by using a well-known setup program or the like.

The first CPU 15 is connected to the image input device 11, the first image memory 12, the first interface device 13, the first storage device 14, and the image processing circuit 16, and controls them. The first CPU 15 performs control operations such as the control of the input image generation by the image input device 11, the control of the first image memory 12, the control of data transmission and reception to and from the information processing apparatus 20 via the first interface device 13, the control of the first storage device 14, and the control of the image processing by the image processing circuit 16.

The image processing circuit 16 is connected to the first image memory 12, and performs processing such as document edge detection, input image correction, etc. The image processing circuit 16 is connected to the first CPU 15 and performs operations under the control of the first CPU 15 in accordance with the program prestored in the first storage device 14. The image processing circuit 16 may be constructed from an independent integrated circuit, microprocessor, firmware, or the like.

The information processing apparatus 20 includes a second interface device 21, a second image memory 22, a display device 23, a second storage device 24, and a second CPU 25. The component elements of the information processing apparatus 20 will be described in detail below.

The second interface device 21 includes an interface circuit similar to the one constituting the first interface device 13 in the image reading apparatus 10, and connects the information processing apparatus 20 to the image reading apparatus 10.

The second image memory 22 includes a storage device similar to the one constituting the first image memory 12 in the image reading apparatus 10. The second image memory 22 stores the image data and various kinds of information received from the image reading apparatus 10 via the second interface device 21.

The display device 23 includes a display, such as a liquid crystal display or an organic EL display, and an interface circuit which outputs image data to the display; the display device 23 is connected to the second image memory 22 and displays the image data retrieved from the second image memory 22.

The second storage device 24, similarly to the first storage device 14 in the image reading apparatus 10, is constructed from a memory device, a fixed disk device, a removable storage device, or the like. The second storage device 24 stores a computer program, data base, table, etc., which are used in the information processing apparatus 20 for various processing operations. The computer program may be installed on the storage device 24 from a computer-readable, non-transitory medium such as a compact disk read only memory (CD-ROM), a digital versatile disk read only memory (DVD-ROM), or the like by using a well-known setup program or the like.

The second CPU 25 is connected to the second interface device 21, the second image memory 22, the display device 23, and the second storage device 24, and controls them. The second CPU 25 performs control operations such as the control of data transmission and reception to and from the image reading apparatus 10 via the second interface device 21, the control of the second image memory 22, the display control for the display device 23, and the control of the second storage device 24.

Figure 2:
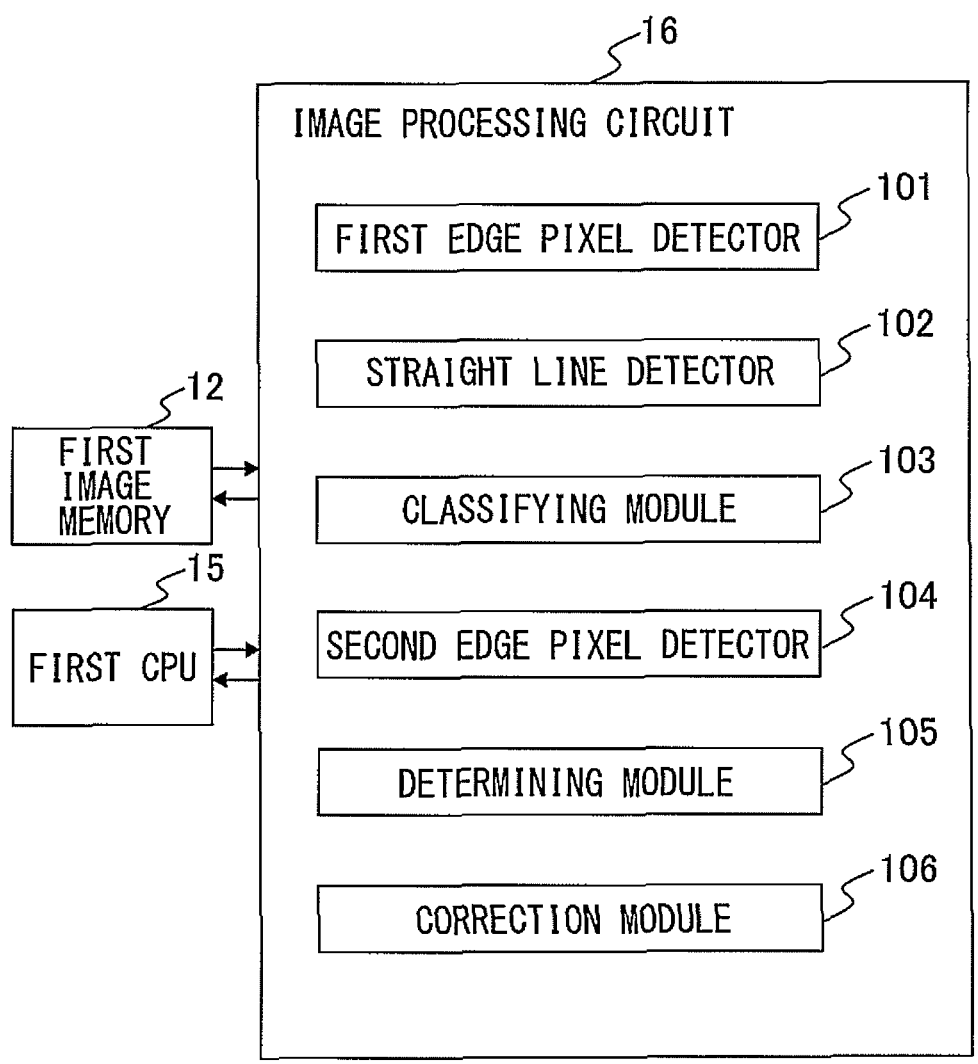
FIG. 2 is a functional block diagram of an image processing circuit.

FIG. 2 is a functional block diagram of the image processing circuit 16. As shown in FIG. 2, the image processing circuit 16 includes a first edge pixel detector 101, a straight line detector 102, a classifying module 103, a second edge pixel detector 104, a determining module 105, and a correction module 106.

Figure 3:
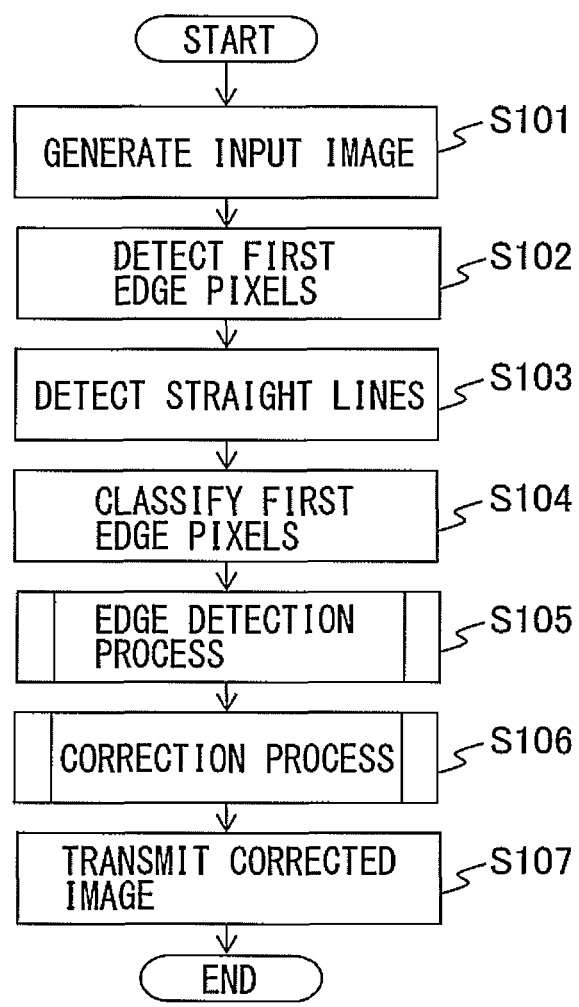
FIG. 3 is a flowchart illustrating the sequence of operations performed to implement an edge detection process and a correction process.

FIG. 3 is a flowchart illustrating the sequence of operations that the image reading apparatus 10 performs to implement the edge detection process and the correction process. The sequence of operations for implementing the edge detection process and the correction process will be described below with reference to the flowchart of FIG. 3. The operation flow described hereinafter is executed primarily by the first CPU 15 in collaboration with the various component elements of the image reading apparatus 10 in accordance with the program prestored in the first storage device 14.

First, the image input device 11 generates an input image by capturing an image of the subject (document), and stores the input image in the first image memory 12 (step S101).

Figure 4:
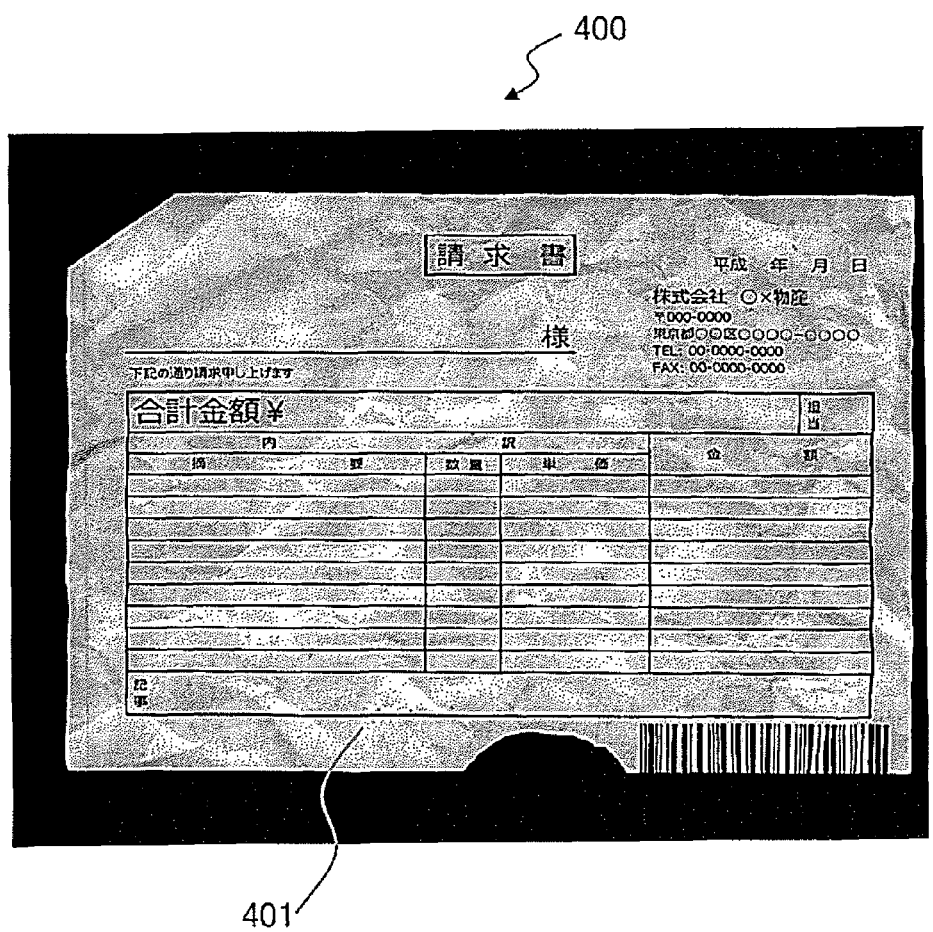
FIG. 4 is a schematic diagram showing an example of an input image.

FIG. 4 is a schematic diagram showing an example of the input image 400. As shown in FIG. 4, the image input device 11 generates the input image 400 by reading an area larger than the expected document size in order to ensure that the edges of the document 401 will be contained in the input image 400 and the edges of the document 401 can be correctly detected from the input image 400.

Next, the first edge pixel detector 101 reads out the luminance component of the input image stored in the first image memory 12 (an image constructed from the luminance component of the input image will hereinafter be referred to as the luminance image), and detects edge pixels from the luminance image (step S102). The first edge pixel detector 101 detects edge pixels corresponding to the left and right edges of the document at predetermined spaced intervals along the vertical direction thereof, and detects edge pixels corresponding to the top and bottom edges of the document at predetermined spaced intervals along the horizontal direction thereof. The edge pixels thus detected by the first edge pixel detector 101 will hereinafter be referred to as the first edge pixels.

Figure 5:
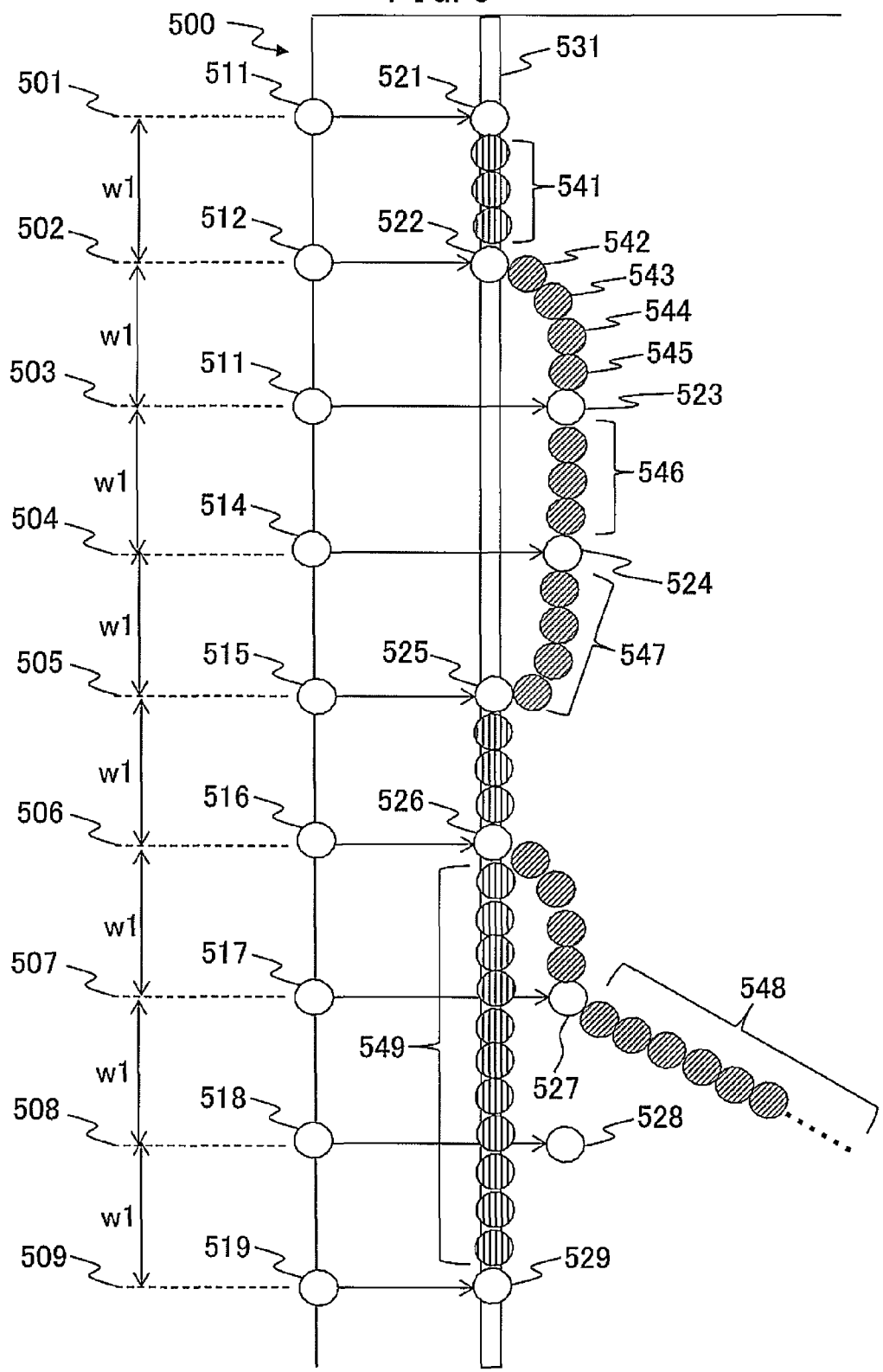
FIG. 5 is a schematic diagram for explaining the edge detection process for detecting the left edge of a document.

FIG. 5 is a schematic diagram for explaining the edge detection process for detecting the left edge of the document. As shown in FIG. 5, the first edge pixel detector 101 scans the luminance image 500 in the rightward direction, starting from each of the leftmost edge pixels 511 to 519 in the luminance image 500 that are located at positions 501 to 509 spaced apart vertically at intervals of width W1 for the detection of first edge pixels. Then, the first edge pixel detector 101 detects, for each of the vertically spaced apart positions, a pixel at which the absolute difference in luminance value between horizontally adjacent pixels (hereinafter referred to as the adjacent luminance difference value) first exceeds a threshold value T1, and takes such pixels 521 to 529 as representing the first edge pixels at the respective vertically spaced apart positions. The width W1 may be set equal to the number of pixels contained, for example, in a width of 2 mm; for example, when the resolution of the input image is 300 dpi, the width W1 is set equal to 23 pixels. The threshold T1 may be set equal to a luminance value difference (for example, 20) below which humans can no longer visually detect the difference in luminance on the image.

In like manner, the first edge pixel detector 101 scans the luminance image in the leftward direction, starting from each of the rightmost edge pixels located at the respective vertically spaced apart positions, detects for each position a pixel at which the adjacent luminance difference value in the horizontal direction first exceeds the threshold value T1, and takes such pixels as representing the first edge pixels corresponding to the right edge of the document.

Further, the first edge pixel detector 101 scans the luminance image in the downward direction, starting from each of the uppermost pixels located at positions horizontally spaced apart for the detection of first edge pixels, detects for each position a pixel at which the adjacent luminance difference value in the vertical direction first exceeds the threshold value T1, and takes such pixels as representing the first edge pixels corresponding to the top edge of the document. In like manner, the first edge pixel detector 101 scans the luminance image in the upward direction, starting from each of the lowermost pixels located at the respective horizontally spaced apart positions, detects for each position a pixel at which the adjacent luminance difference value in the vertical direction first exceeds the threshold value T1, and takes such pixels as representing the first edge pixels corresponding to the bottom edge of the document.

Figure 6:
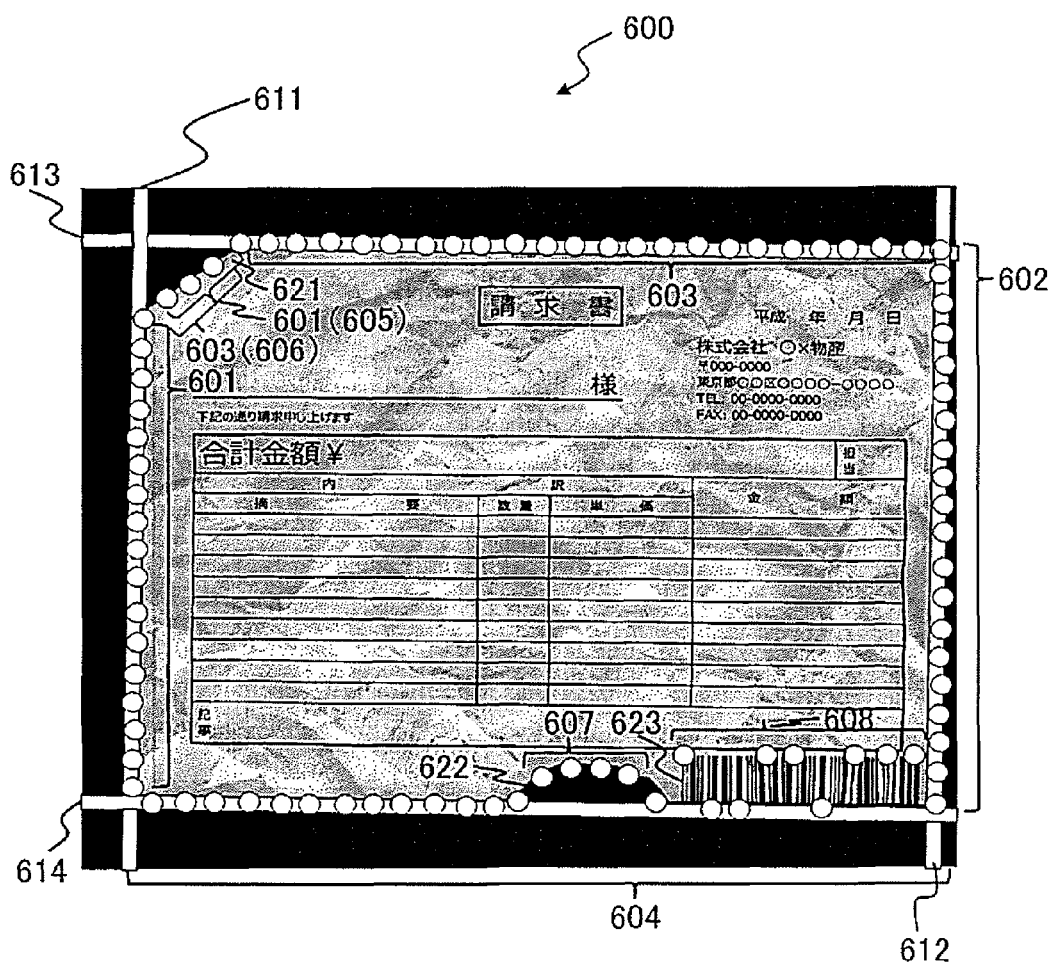
FIG. 6 is a schematic diagram showing, by way of example, first edge pixels detected on the input image of FIG. 4.

FIG. 6 is a schematic diagram showing, by way of example, the first edge pixels detected on the input image of FIG. 4. As shown in FIG. 6, the first edge pixels 601 are detected for the left edge of the document, and the first edge pixels 602 are detected for the right edge, while on the other hand, the first edge pixels 603 are detected for the top edge, and the first edge pixels 604 are detected for the bottom edge. The first edge pixels 605 in the set of first edge pixels 601 corresponding to the left edge and the first edge pixels 606 in the set of first edge pixels 603 corresponding to the top edge are detected along a torn portion 621 in the upper left corner of the document. On the other hand, in the set of first edge pixels 604 corresponding to the bottom edge, the first edge pixels 607 are detected along a torn portion 622 at the bottom edge of the document, and the first edge pixels 608 are detected on a barcode 623 located at the bottom edge.

Next, the straight line detector 102 detects straight lines from the first edge pixels detected by the first edge pixel detector 101 (step S103). From the first edge pixels corresponding to the left edge of the document, the straight line detector 102 detects a straight line corresponding to the left edge of the document by using a Hough transform. Alternatively, the straight line detector 102 may detect the straight line by using a least squares method.

As shown in FIG. 5, the straight line detector 102 detects the straight line 531 from the first edge pixels 521 to 529 corresponding to the left edge of the document.

In like manner, the straight line detector 102 detects a straight line corresponding to the right edge of the document from the first edge pixels corresponding to the right edge of the document, detects a straight line corresponding to the top edge of the document from the first edge pixels corresponding to the top edge of the document, and detects a straight line corresponding to the bottom edge of the document from the first edge pixels corresponding to the bottom edge of the document.

In the example shown in FIG. 6, the straight line 611 is detected from the first edge pixels 601 corresponding to the left edge of the document, the straight line 612 is detected from the first edge pixels 602 corresponding to the right edge, the straight line 613 is detected from the first edge pixels 603 corresponding to the top edge, and the straight line 614 is detected from the first edge pixels 604 corresponding to the bottom edge. The set of first edge pixels 601 corresponding to the left edge contains the first edge pixels 605 that, due to the presence of the torn portion 621, do not lie on the straight line representing the true left edge of the document. However, since most of the first edge pixels 601 lie on the straight line representing the true left edge of the document, the straight line 611 is detected substantially along the straight line representing the true left edge. Likewise, from the first edge pixels 603 corresponding to the top edge and the first edge pixels 604 corresponding to the bottom edge, the straight lines 613 and 614 are detected substantially along the straight lines representing the true top edge and bottom edge, respectively.

Next, the classifying module 103 classifies the first edge pixels detected by the first edge pixel detector 101 into on-line edge pixels which are located within a predetermined distance from the straight line detected by the straight line detector 102 and non-on-line edge pixels which are not located within the predetermined distance (step S104). The predetermined distance is set so that any given first edge pixel that can be assumed to lie on the straight line can be classified as an on-line edge pixel; for example, the distance may be set equal to four pixels. The classifying module 103 calculates the distance between each first edge pixel corresponding to a given document edge and the straight line corresponding to that given edge and, if the calculated distance is not greater than the predetermined distance, then determines that the first edge pixel is an on-line edge pixel; otherwise, it is determined that the first edge pixel is a non-on-line edge pixel.

As shown in FIG. 5, the classifying module 103 classifies the first edge pixels 521, 522, 525, 526, and 529, each located near the straight line 531, as on-line edge pixels, and classifies the first edge pixels 523, 524, 527, and 528, not located near the straight line 531, as non-on-line edge pixels.

In the example shown in FIG. 6, the first edge pixels 605 and 606 detected along the torn portion 621, the first edge pixels 607 detected along the torn portion 622, and the first edge pixels 608 detected along the barcode 623 are classified by the classifying module 103 as non-on-line edge pixels. The other first edge pixels are classified as on-line edge pixels.

Next, the second edge pixel detector 104 and the determining module 105 carry out the edge detection process (step S105). In the edge detection process, the second edge pixel detector 104 detects edge pixels located between the first edge pixels (the edge pixels detected by the second edge pixel detector 104 will hereinafter be referred to as the second edge pixels). The determining module 105 detects a document edge from these first and second edge pixels. The details of the edge detection process will be described later.

The correction module 106 carries out the correction process (step S106). In the correction process, the correction module 106 generates a corrected image by correcting the regions outside the document edges detected from the input image in the edge detection process. The details of the correction process will be described later.

The first CPU 15 transmits the corrected image to the information processing apparatus 20 via the first interface device 12 (step S107), and terminates the series of steps.

In the information processing apparatus 20, the second CPU 25 receives the input image from the image reading apparatus 10 via the second interface device 21, and stores the received input image in the second image memory 22. Further, the second CPU 25 causes the display device 23 to display the input image so that the user can visually check the image.

Figure 7:
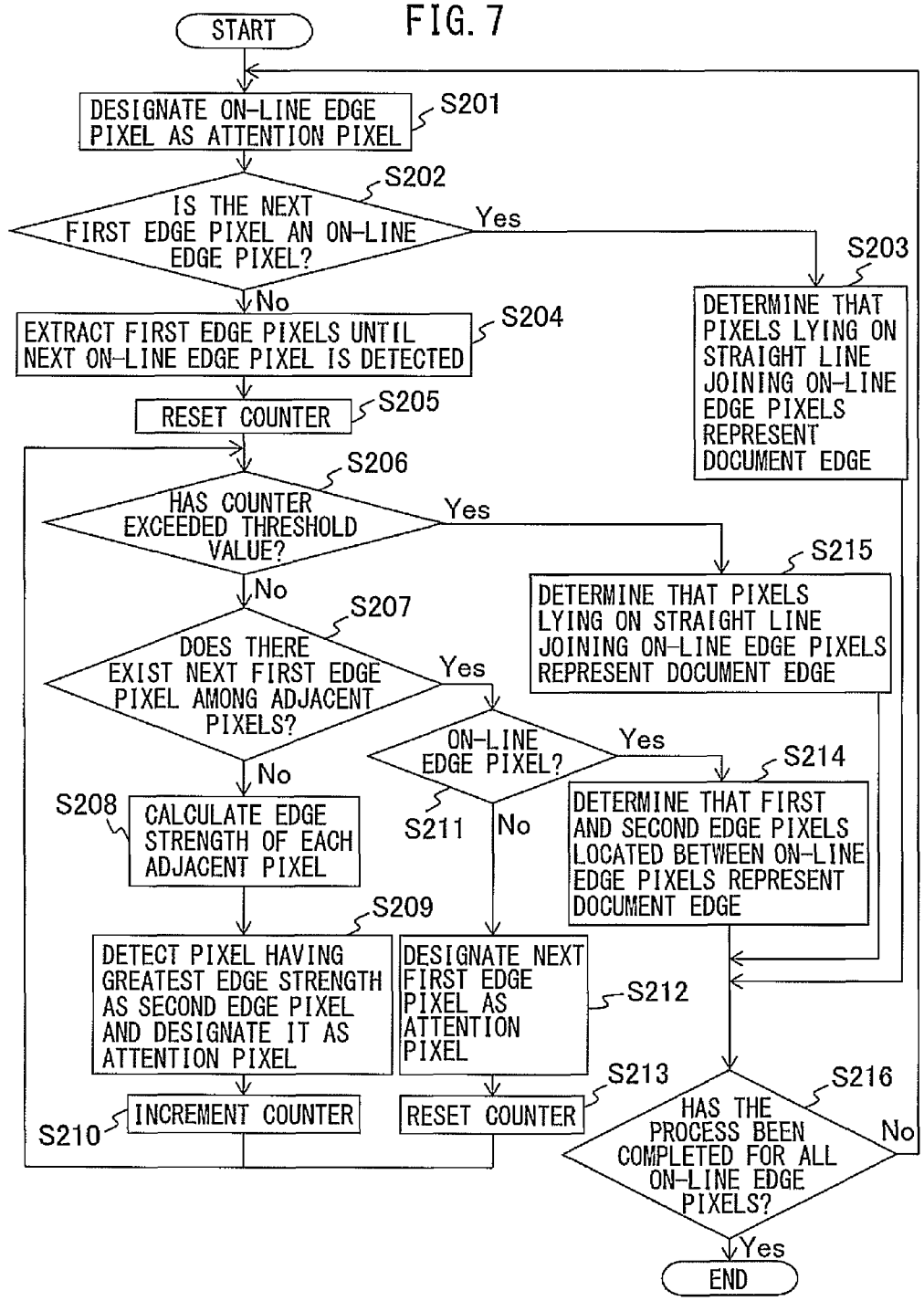
FIG. 7 is a flowchart illustrating an example of the sequence of operations performed to implement the edge detection process.

FIG. 7 is a flowchart illustrating an example of the sequence of operations performed to implement the edge detection process.

The operation flow of FIG. 7 is carried out in step S105 in the flowchart shown in FIG. 3. The edge detection process is performed for each of the left, right, top, and bottom edges of the document, but the following description deals with the detection process for the left edge as a representative example. In the detection process, it is assumed that the process is performed by working through the first edge pixels corresponding to the left edge of the document in sequence, starting from the first edge pixel located at the top and progressing toward the first edge pixel located at the bottom.

First, the second edge pixel detector 104 detects the on-line edge pixel located at the uppermost position among the first edge pixels corresponding to the left edge of the document, and designates this on-line edge pixel as the attention pixel (step S201). In the example shown in FIG. 5, the first edge pixel (on-line edge pixel) 521 is designated as the attention pixel.

Then, the second edge pixel detector 104 checks the first edge pixel located at the position next to (downward of) the attention pixel to see whether it is an on-line edge pixel or not (step S202). In the example shown in FIG. 5, when the first edge pixel 521 is designated as the attention pixel, the first edge pixel 522 located at the next position is checked to see whether it is an on-line edge pixel or not.

If the first edge pixel located at the position next to the attention pixel (on-line edge pixel) is an on-line edge pixel, the second edge pixel detector 104 determines that the two on-line edge pixels and the pixels lying on the straight line joining the two on-line edge pixels represent a document edge (step S203). In the example shown in FIG. 5, it is determined that the first edge pixel 522 is an on-line edge pixel, and therefore that the pixels 541 lying on the straight line joining the two first edge pixels 521 and 522 represent a document edge.

On the other hand, if the first edge pixel located at the position next to the attention pixel is not an on-line edge pixel, the second edge pixel detector 104 searches further downward through the first edge pixels until a first edge pixel corresponding to an on-line edge pixel is detected. When an on-line edge pixel is detected, the second edge pixel detector 104 extracts not only the detected on-line edge pixel itself but all the non-on-line edge pixels located between the attention pixel and the detected on-line edge pixel (step S204). In the example shown in FIG. 5, when the first edge pixel 522 is the attention pixel, a search is made through the first edge pixels until the next on-line edge pixel, i.e., the first edge pixel 525, is detected, and the first edge pixels 522, 523, 524, and 525 are extracted.

Next, the second edge pixel detector 104 resets the counter used to determine whether the non-on-line edge pixels extracted in step S204 are pixels representing a document edge (step S205). This counter counts the number of second edge pixels detected between two adjacent first edge pixels, and is incremented each time one second edge pixel is detected, as will be described later.

Next, the second edge pixel detector 104 determines whether the counter has exceeded a threshold value T2 (step S206).

If the counter has not yet exceeded the threshold value T2, the second edge pixel detector 104 determines whether there is, among the pixels adjacent to the attention pixel, any first edge pixel located at the position next to (downward of) the most recently detected first edge pixel (step S207).

If there is no such first edge pixel among the pixels adjacent to the attention pixel, the second edge pixel detector 104 calculates the edge strength of each pixel adjacent to the attention pixel (step S208). Among the adjacent luminance difference values calculated in the horizontal and vertical directions for that pixel and the adjacent luminance difference values calculated relative to the pixels adjacent at the upper left and lower right and the pixels adjacent at the lower left and upper right, the second edge pixel detector 104 takes the largest adjacent luminance difference value as the edge strength.

Next, the second edge pixel detector 104 detects, as the second edge pixel, the pixel that has the greatest edge strength among the pixels adjacent to the attention pixel and not yet detected as the second edge pixels, and designates the thus detected second edge pixel as the next attention pixel (step S209). In the example shown in FIG. 5, when the first edge pixel 522 is the attention pixel, the pixel 542 is detected as the second edge pixel and designated as the next attention pixel. In this way, the second edge pixel 542 is detected between the on-line edge pixel designated as the attention pixel in step S201 and the on-line edge pixel extracted in step S204.

Next, the second edge pixel detector 104 increments the counter (step S210). After that, the second edge pixel detector 104 returns the process to step S206, and repeats the process starting from step S206 for the newly designated attention pixel.

The second edge pixel detector 104 may give more weight to the edge strengths of all the adjacent pixels of the current attention pixel according to the direction in which the current attention pixel was detected from its preceding attention pixel, i.e., the direction in which the attention pixel moves, and may detect the pixel of the largest weighted edge strength as the second edge pixel. If an edge of the document is folded or torn, it is highly likely that the edge pixels occurring due to the presence of the folded or torn portion are connected in a given direction. Therefore, by giving weight so as to increase the edge strength of the pixel located in the direction in which the attention pixel moves, the second edge pixel detector 104 can detect the second edge pixel with higher accuracy.

Further, the second edge pixel detector 104 may give more weight to the edge strengths according to the direction in which the edge is detected in the edge detection process, and may detect the pixel of the largest weighted edge strength as the second edge pixel. In this case, the second edge pixel detector 104 applies weights so as to increase the edge strength of the pixel adjacent at the lower right when detecting the left edge of the document in the downward direction, the edge strength of the pixel adjacent at the lower left when detecting the right edge in the downward direction, the edge strength of the pixel adjacent at the lower right when detecting the top edge in the rightward direction, and the edge strength of the pixel adjacent at the upper right when detecting the bottom edge in the rightward direction.

If, in step S207, the next first edge pixel is detected among the pixels adjacent to the attention pixel, the second edge pixel detector 104 determines whether this first edge pixel is an on-line edge pixel or not (step S211). In the example shown in FIG. 5, the pixels 542 to 545 are sequentially detected as the second edge pixels and, when the pixel 545 becomes the attention pixel, it is determined whether the first edge pixel 523 adjacent to the pixel 545 is an on-line edge pixel or not.

If the first edge pixel is not an on-line edge pixel, the second edge pixel detector 104 designates this first edge pixel as the next attention pixel (step S212). In the example shown in FIG. 5, if it is determined whether the first edge pixel 523 is an on-line edge pixel or not, it is determined that the first edge pixel 523 is not an on-line edge pixel, and this first edge pixel is therefore designated as the next attention pixel.

Next, the second edge pixel detector 104 resets the counter (step S213), and returns the process to step S206 to repeat the process starting from step S206 for the newly designated attention pixel.

On the other hand, if it is determined in step S211 that the first edge pixel is an on-line edge pixel, the determining module 105 determines that the on-line edge pixel designated as the attention pixel in step S201 and the on-line edge pixel extracted in step S204 have been connected by the second edge pixels via the non-on-line edge pixels. In this case, the determining module 105 determines that the first edge pixels extracted in step S204 and the second edge pixels detected in step S209 represent a document edge (step S214). In the example shown in FIG. 5, when the edge detection proceeds up to the first edge pixel 525, it is determined that the first edge pixels 522 to 525 and the second edge pixels 542 to 547 represent a document edge.

When there is only one non-on-line edge pixel between the two on-line edge pixels, the above sentence "the on-line edge pixels have been connected by the second edge pixels via the non-on-line edge pixels" means that each on-line edge pixel is connected to the non-on-line edge pixel by interposing the second edge pixel(s) therebetween. On the other hand, when there is more than one non-on-line edge pixel between the two on-line edge pixels, the above sentence means that each on-line edge pixel is connected to its adjacent non-on-line edge pixel by interposing the second edge pixel(s) therebetween, while each non-on-line edge pixel is connected to its adjacent non-on-line edge pixel by interposing the second edge pixel(s) therebetween.

If, in step S206, the counter has exceeded the threshold value T2, the determining module 105 determines that the on-line edge pixel designated as the attention pixel in step S201, the on-line edge pixel extracted in step S204, and the pixels lying on the straight line joining the two on-line edge pixels represent a document edge (step S215). In the example shown in FIG. 5, when the second edge pixels 548 are detected for the first edge pixel 527, the counter exceeds the threshold value T2 before reaching the next first edge pixel 528. In this case, it is determined that the pixels 549 lying on the straight line joining the two on-line edge pixels, i.e., the first edge pixels 526 and 529, represent a document edge.

As noted earlier, the counter is incremented each time one second edge pixel is detected, and is reset when the next first edge pixel is detected. That is, when the counter has exceeded the threshold value T2, the second edge pixels successively detected following a given first edge pixel will not connect to the next first edge pixel even if such second edge pixels are connected over more than a prescribed distance (the threshold value T2) from the given first edge pixel. In this case, it is highly likely that the given first edge pixel (non-on-line edge pixel) and the second edge pixels are not connected to the next on-line edge pixel. Therefore, the determining module 105 determines that the given first edge pixel and the second edge pixels do not represent a document edge but represent part of the content of the document such as characters and graphics. Further, the determining module 105 determines that other non-on-line edge pixels and second edge pixels connected to the given first edge pixel (non-on-line edge pixel) likewise represent part of the content of the document and do not represent a document edge.

On the other hand, when the counter is reset before exceeding the threshold value T2, the second edge pixels successively detected following a given first edge pixel connect to the next first edge pixel located within the prescribed distance (the threshold value T2) from the given first edge pixel. Then, when the two on-line edge pixels are connected, it is highly likely that the non-on-line edge pixels have occurred due to the presence of a torn document edge. Therefore, in this case, the determining module 105 determines that the connected first edge pixels and second edge pixels represent a document edge.

When the document edge is detected by the determining module 105 in step S203, S214, or S215, the image processing circuit 16 determines whether the process has been completed for all the on-line edge pixels (step S216). If the process has not yet been completed for all the on-line edge pixels, the image processing circuit 16 returns the process to step S201 to repeat the process of steps S201 to S215. In this case, the second edge pixel detector 104 designates a new attention pixel by selecting the on-line edge pixel next to the on-line edge pixel designated as the attention pixel in step S201 in the preceding cycle of the process. When the process has been completed for all the on-line edge pixels, the image processing circuit 16 terminates the series of steps.

In like manner, the second edge pixel detector 104 and the determining module 105 proceed to detect the right edge, top edge, and bottom edge of the document. Further, the second edge pixel detector 104 and the determining module 105 perform processing to connect the detected left edge, right edge, top edge, and bottom edge of the document.

Figure 8:
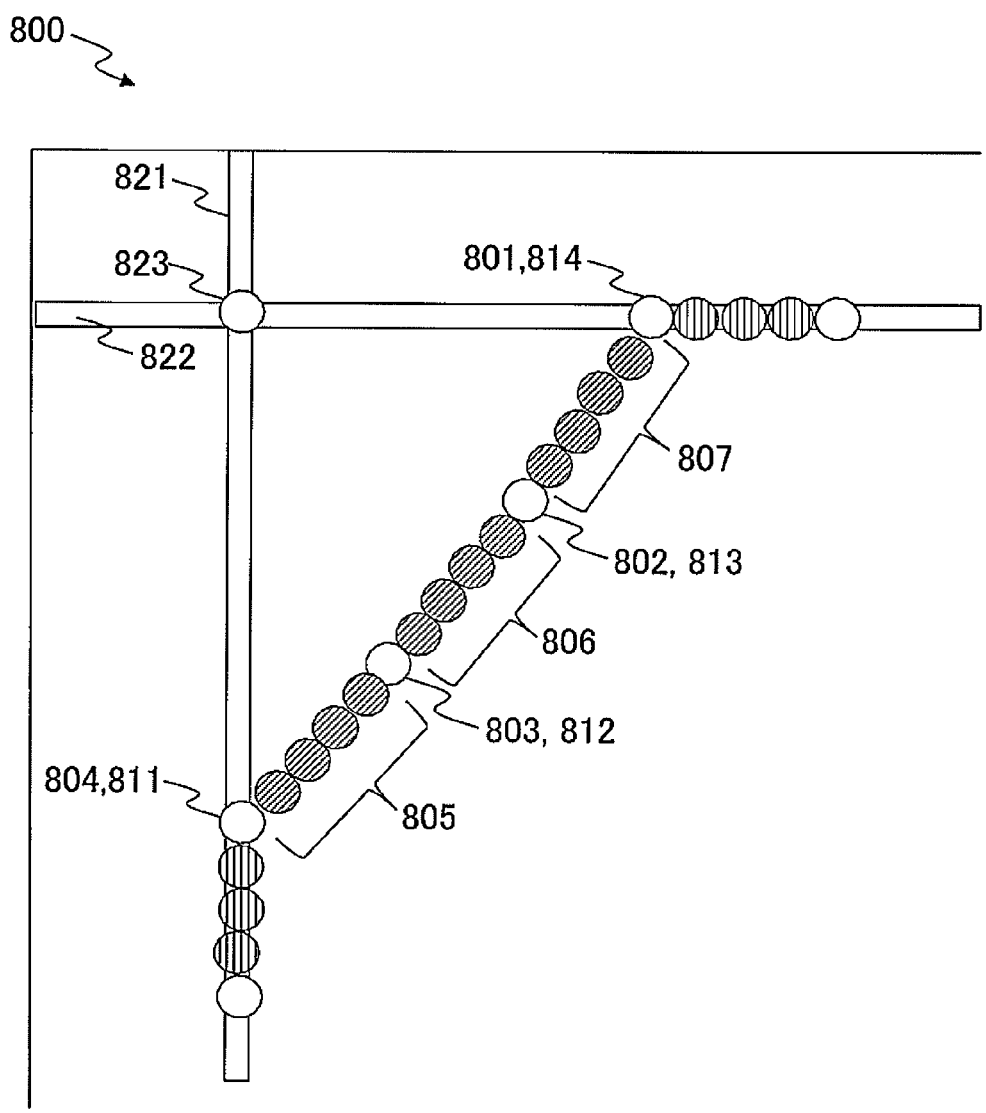
FIG. 8 is a schematic diagram for explaining how the left edge and top edge of the document are connected.

FIG. 8 is a schematic diagram for explaining how the left edge and top edge of the document are connected. In the example shown in FIG. 8, first edge pixels 801 to 804 are detected for the left edge of the document, and first edge pixels 811 to 814 are detected for the top edge of the document. The first edge pixels 804 and 814 are on-line edge pixels, while the first edge pixels 801 to 803 and 811 to 813 are non-on-line edge pixels.

First edge pixels, such as the first edge pixels 801 to 804 and 811 to 814, that are located in any one of the four corners of the document may be detected in overlapping fashion between the two edges forming the corner. Therefore, the determining module 105 removes one of the first edge pixels detected in overlapping fashion between the two edges. When an on-line edge pixel and a non-on-line edge pixel are detected in overlapping fashion, the determining module 105 removes the non-on-line edge pixel. The following description will be given by assuming that the first edge pixels 811 to 813 detected for the top edge and the first edge pixel 801 detected for the left edge have been removed.

The second edge pixel detector 104 performs the flowchart of FIG. 7, starting from the on-line edge pixel 804 detected for the left edge and progressing toward the on-line edge pixel 814 detected for the top edge. When the on-line edge pixels 804 and 814 are connected by the second edge pixels 805 to 807 via the non-on-line edge pixels 803 and 802, the second edge pixel detector 104 determines that the non-on-line edge pixels 803 and 802 and the second edge pixels 805 to 807 represent a document edge.

On the other hand, when the on-line edge pixels 804 and 814 are unable to be connected, the second edge pixel detector 104 obtains an intersection 823 between the straight line 821 representing the left edge and the straight line 822 representing the top edge. Then, the second edge pixel detector 104 determines that the pixels lying on the straight line joining between the intersection 823 and the on-line edge pixel 804 and the pixels lying on the straight line joining between the intersection 823 and the on-line edge pixel 814 respectively represent document edges.

In step S207, the second edge pixel detector 104 may determine whether there exists the next first edge pixel among the pixels located within a predetermined range of the attention pixel, rather than determining whether there exists the next first edge pixel among the pixels adjacent to the attention pixel. Then, in steps S208 and S209, the second edge pixel detector 104 calculates the edge strength of each of the pixels located within the predetermined range of the attention pixel, and detects, as the second edge pixel, the pixel that has the greatest edge strength among the pixels not yet detected as the second edge pixels. Then, in step S214, the determining module 105 determines that the first edge pixels extracted in step S204, the second edge pixels detected in step S209, and the pixels lying on the straight line joining adjacent edge pixels represent a document edge. That is, the determining module 105 determines whether the detected second edge pixel and the on-line edge pixel corresponding to the detected second edge pixel represent a document edge or not, based on whether or not the next first edge pixel and the detected second edge pixel are located within a predetermined distance from each other.

Figure 9:
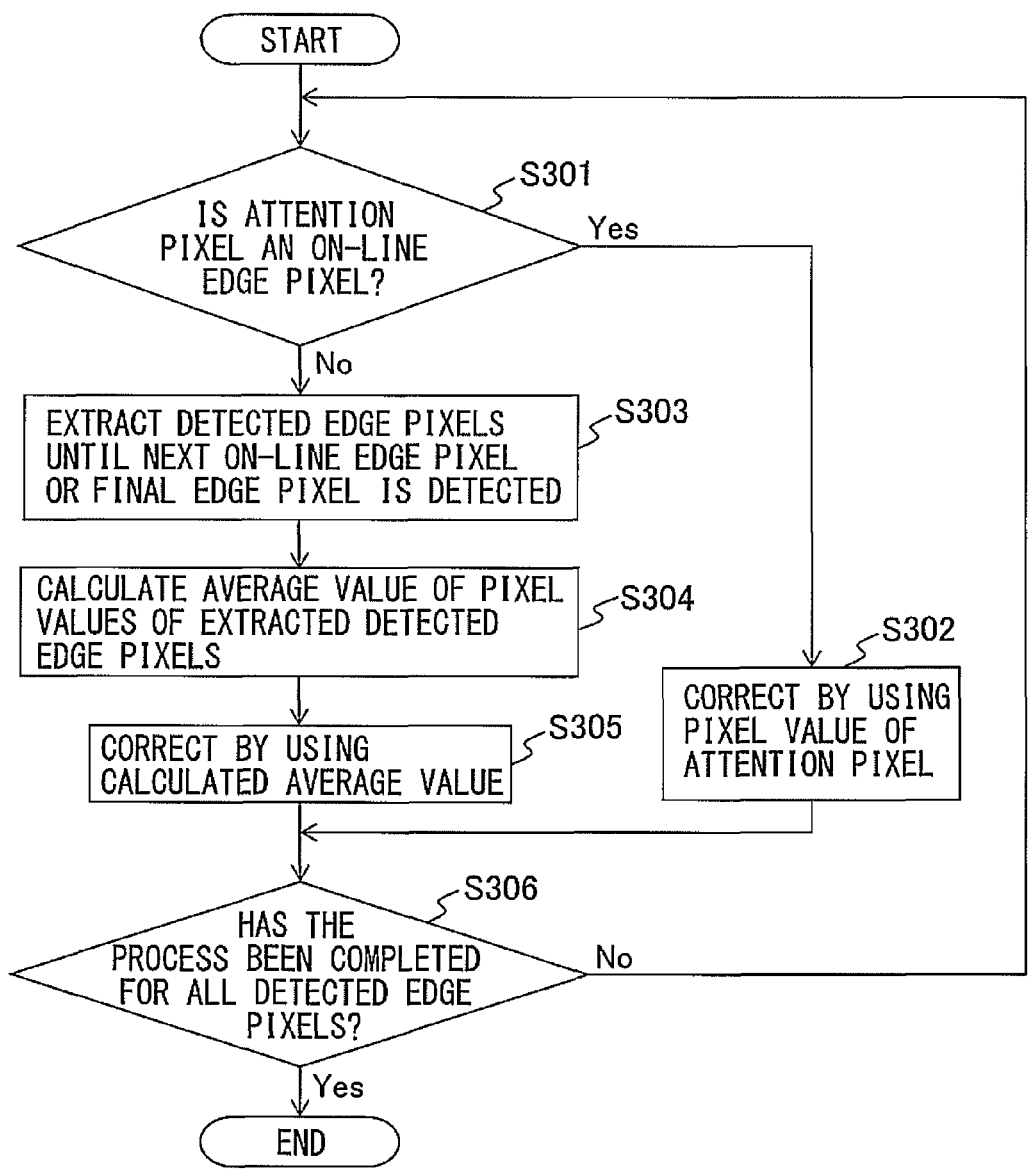
FIG. 9 is a flowchart illustrating an example of the sequence of operations performed to implement the correction process.

FIG. 9 is a flowchart illustrating an example of the sequence of operations performed to implement the correction process.

The operation flow of FIG. 9 is carried out in step S106 in the flowchart shown in FIG. 3. The correction process is performed for each of the left, right, top, and bottom edges of the document detected in the edge detection process, but the following description deals with the correction process for the left edge as a representative example. In the following, the first and second edge pixels corresponding to the edge of the document detected in the edge detection process will be referred to as the detected edge pixels. In the correction process for the left edge of the document, it is assumed that the process is performed by working through the detected edge pixels corresponding to the left edge of the document in sequence, starting from the detected edge pixel located at the uppermost position and progressing toward the detected edge pixel located at the lowermost position. The correction module 106 performs the correction process by designating the detected edge pixel located at the uppermost position as the first attention pixel.

First, the correction module 106 checks the attention pixel to see whether it is an on-line edge pixel or not (step S301). In the correction process, even when the attention pixel is a second edge pixel, the correction module 106 treats the pixel as an on-line edge pixel if it is located within a predetermined distance from the straight line detected by the straight line detector 102, and as a non-on-line edge pixel if it is not located within the predetermined distance.

If the attention pixel is an on-line edge pixel, the correction module 106 corrects every pixel in the input image whose position in the vertical direction is the same as that of the attention pixel and whose position in the horizontal direction is located between the attention pixel and the straight line detected by the straight line detector 102 (step S302). In this case, the correction module 106 corrects every such pixel by changing its pixel value to the pixel value of the attention pixel. In this way, the correction module 106 can remove noise, etc., occurring in the vicinity of the document edge. Alternatively, the correction module 106 may change the pixel value of every such pixel to the pixel value of the pixel located a predetermined number of pixels away on the side of the attention pixel opposite from the straight line detected by the straight line detector 102. In this case, the correction module 106 can correct the region in the vicinity of the document edge by using pixels that are more likely to represent the document background. Further alternatively, the correction module 106 may correct every such pixel by changing its pixel value to the average value of the pixel values of the two on-line edge pixels detected as the first edge pixels and all the pixels detected between the two on-line edge pixels.

On the other hand, if the attention pixel is not an on-line edge pixel, the correction module 106 searches further downward through the detected edge pixels until an on-line edge pixel or the final edge pixel is detected. When an on-line edge pixel or the final edge pixel is detected, the correction module 106 extracts not only the attention pixel itself but all the detected edge pixels searched through until the above-mentioned pixel is detected (step S303).

Next, the correction module 106 calculates the average value of the pixel values of all the detected edge pixels thus extracted (step S304). Then, for each of the detected edge pixels extracted, the correction module 106 corrects every pixel in the input image whose position in the vertical direction is the same as that of the detected edge pixel and whose position in the horizontal direction is located between the detected edge pixel and the straight line detected by the straight line detector 102 (step S305). In this case, the correction module 106 corrects every such pixel by changing its pixel value to the average value calculated in step S304. In this way, the correction module 106 can correct the region containing a torn portion of the document without causing any unevenness. Alternatively, in step S304, the correction module 106 may calculate the average value of the pixel values of the pixels located a predetermined number of pixels away on the side of extracted detected edge pixels opposite from the straight line detected by the straight line detector 102. In this case, the correction module 106 can correct the region containing a torn portion of the document by using pixels that are more likely to represent the document background. Further alternatively, the correction module 106 may correct every such pixel by changing its pixel value to the pixel value of a detected pixel whose position in the horizontal direction is the same as that of the pixel to be corrected.

When the correction is done in step S302 or S305, the correction module 106 determines whether the process has been completed for all the detected edge pixels (step S306). If the process has not yet been completed for all the detected edge pixels, the correction module 106 designates as the next attention pixel the detected edge pixel that follows the detected edge pixel corresponding to the pixel corrected in step S302 or S305. Then, the correction module 106 returns to the process to step S301 to repeat the process of steps S301 to S306. When the process has been completed for all the detected edge pixels, the correction module 106 terminates the series of steps.

In like manner, the correction module 106 proceeds to detect the right edge, top edge, and bottom edge of the document, and generates the corrected image.

As described in detail above, by performing operations in accordance with the flowcharts of FIGS. 3, 7, and 9, the image reading apparatus 10 can accurately determine whether the edge pixels located near a document edge represents the document edge itself or part of the content of the document, even when the content located near the document edge has a gray level about the same as that of the document backing surface. The image reading apparatus 10 can thus detect document edges accurately from the readout image, making it possible to correct the regions outside the document without damaging the content.

Figure 10:
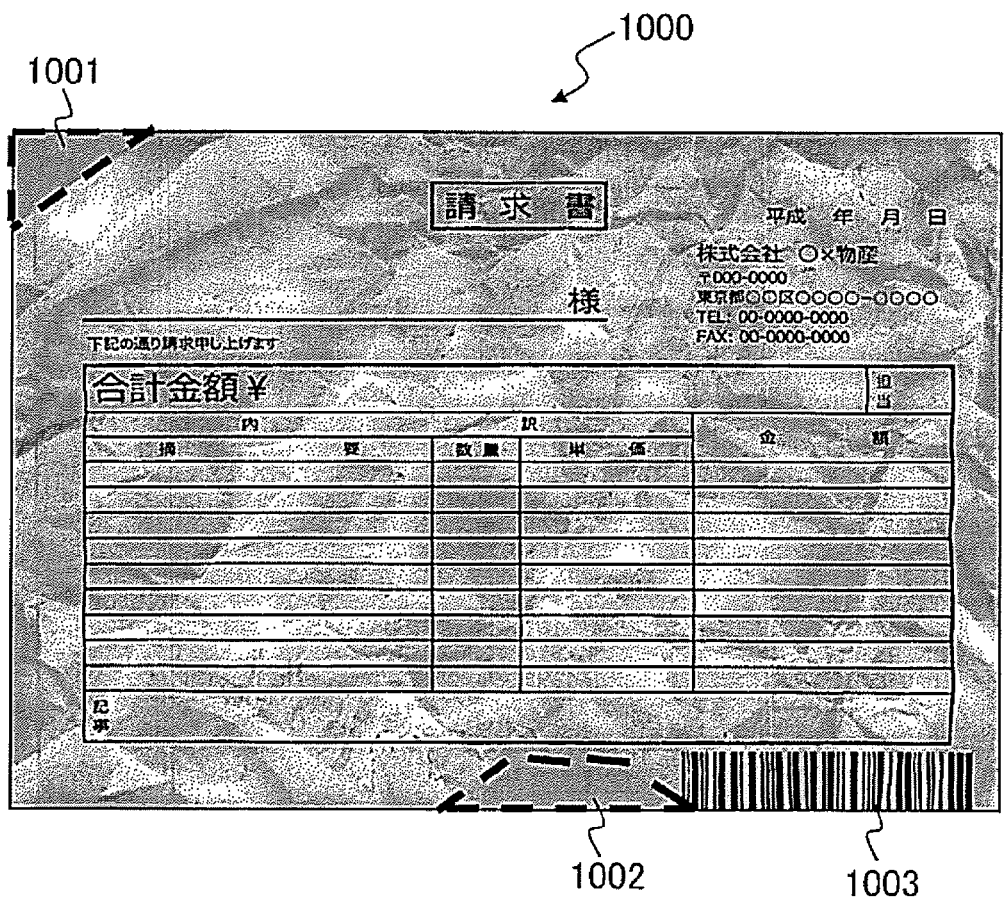
FIG. 10 is a schematic diagram showing an example of a corrected image.

FIG. 10 is a schematic diagram showing an example of a corrected image 1000 generated by detecting document edges and correcting the input image in accordance with the flowcharts of FIGS. 3, 7, and 9. As shown in FIG. 6, the image reading apparatus 10 determines that, in the sets of edge pixels 601 to 604 detected from the input image, the edge pixels 605, 606, and 607 are those detected due to the presence of torn portions of the document and represent document edges, while the edge pixels 608 are detected due to the presence of content and do not represent document edges. Then, the region enclosed by the straight lines 611 to 614 is taken as representing the outer shape of the document, and the corrected image 1000 is generated by correcting the regions located between the respective straight lines 611 to 614 and the detected edge pixels. In the corrected image 1000, the torn portion 1001 in the upper left corner of the document and the torn portion 1002 at the bottom edge are corrected. On the other hand, the barcode 1003 located at the bottom edge are detected as edge pixels but are excluded from the pixels representing the document edges; as a result, no correction is applied to the region in the vicinity of the barcode 1003.

Figure 11:
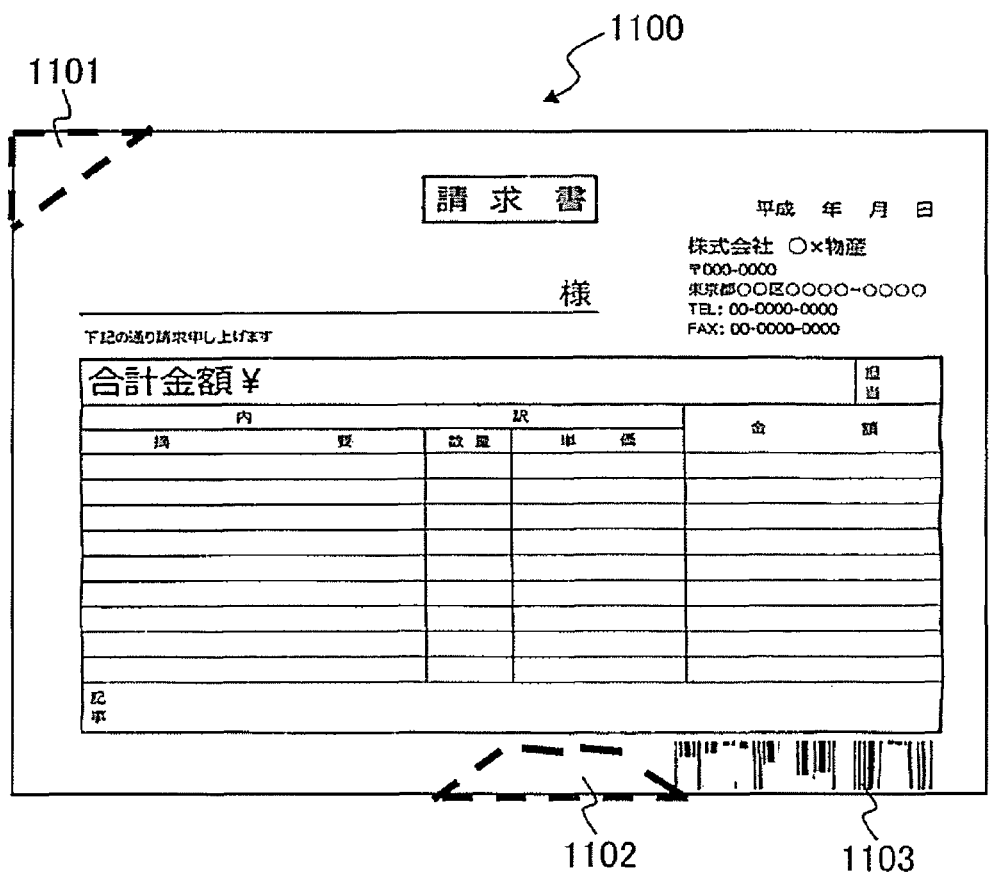
FIG. 11 is a schematic diagram showing an example of a corrected image according to the prior art.

FIG. 11 is a schematic diagram showing an example of a corrected image 1100 generated by correcting the input image by using a prior art correction function. In the corrected image 1100 also, the torn portion 1101 in the upper left corner of the document and the torn portion 1102 at the bottom edge are corrected accordingly, but the region in the vicinity of the barcode 1103 is also corrected erroneously, and part of the barcode 1103 is therefore lost.

Figure 12:
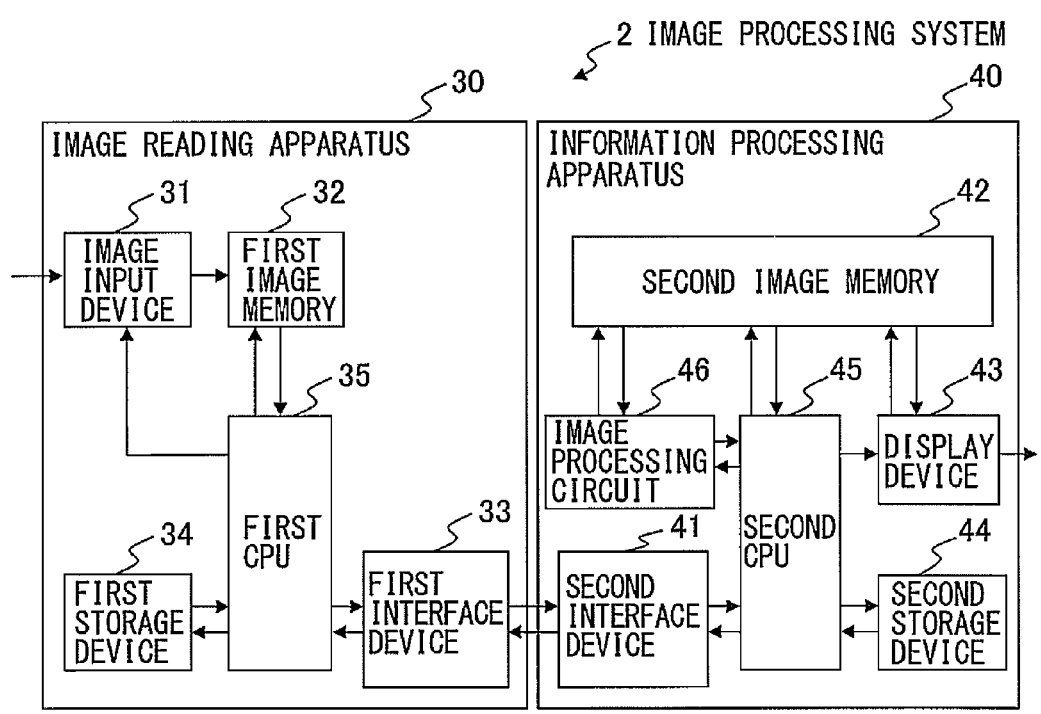
FIG. 12 is a diagram showing the hardware configuration of an alternative image processing system according to an embodiment.

FIG. 12 is a diagram showing the hardware configuration of an alternative image processing system 2. The image processing system 2 of FIG. 12 differs from the image processing system 1 of FIG. 1 in that the apparatus equipped with the image processing circuit is different. More specifically, in the image processing system 2, the information processing apparatus 40, not the image reading apparatus 30, is equipped with the image processing circuit 46. The image processing circuit 46 is identical in function to the image processing circuit 16 provided in the image reading apparatus 10 shown in FIG. 1.

The image processing system 2 of FIG. 12 can perform substantially the same processing operations as those illustrated in FIGS. 3, 7, and 9. The following describes how the detection process illustrated in the flowchart of FIG. 3 is applied here. In the image processing system 2, the process of step S101 is carried out primarily by the first CPU 35 in collaboration with the various component elements of the image reading apparatus 30 in accordance with the program prestored in the first storage device 34, and the process of steps S102 to S106 is carried out primarily by the second CPU 45 in collaboration with the various component elements of the information processing apparatus 40 in accordance with the program prestored in the second storage device 44.

In step S101, the image input device 31 in the image reading apparatus 30 generates an input image and stores it in the first image memory 32, and the first CPU 35 transmits the input image via the first interface device 33 to the information processing apparatus 40. On the other hand, in the information processing apparatus 40, when the input image transmitted from the image reading apparatus 30 is received via the second interface device 41, the second CPU 45 stores the received input image in the second image memory 42.

The process of steps S102 to S106 is carried out by the image processing circuit 46 in the information processing apparatus 40. The sequence of operations in this process is the same as that carried out by the image processing circuit 16 in the image reading apparatus 10 earlier described in connection with the image processing system 1. In the image processing system 2, the corrected image transmission step S107 is omitted, because the edge detection and image correction are performed by the image processing circuit 46 in the information processing apparatus 40.

As described above, when the information processing apparatus 40 is equipped with the image processing circuit 46 and performs the edge detection and image correction, the same effect can be achieved as when the image reading apparatus is equipped with the image processing circuit and performs the edge detection and image correction.

While the present invention has been described above with reference to the preferred embodiments thereof, it will be appreciated that the present invention is not limited to the above specific embodiments. For example, the division of functionality between the image reading apparatus and the information processing apparatus is not limited to the example of the image processing system illustrated in FIG. 1 or 12, but the functional units, including those of the image processing circuit, may be interchanged as desired between the image reading apparatus and the information processing apparatus. Alternatively, the image reading apparatus and the information processing apparatus may be combined into one apparatus.

Further, in the image processing system 1 of FIG. 1, the first interface device 13 in the image reading apparatus 10 may be connected to the second interface device 21 in the information processing apparatus 20 via a network, such as the Internet, a telephone network (including a mobile telephone network or a public switched telephone network), or an intranet, rather than directly connecting them together. In that case, the first interface device 13 and the second interface device 21 are each equipped with a communication interface circuit for connection to the network.

Likewise, in the image processing system 2 of FIG. 12 also, the first interface device 33 in the image reading apparatus 30 and the second interface device 41 in the information processing apparatus 40 may be connected via a network. In that case, a plurality of information processing apparatuses 40 may be installed in a distributed manner over the network so that the image processing service can be provided in the form of cloud computing, and the image processing such as the edge detection, image correction, etc., and other processing such as image storage may be performed with the information processing apparatuses 40 collaborating with each other. In this way, the image processing system 2 can efficiently perform the edge detection and image correction operations on input images generated by a plurality of image reading apparatuses 30.

According to the image processing apparatus and image processing method, and the computer-readable, non-transitory medium, it becomes possible to accurately detect document edges from a readout image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
   a first edge pixel detector for detecting a plurality of first edge pixels from an input image;
   a straight line detector for detecting a straight line from the plurality of first edge pixels;
   a classifying module for classifying the plurality of first edge pixels into on-line edge pixels which are located within a predetermined distance from the straight line and non-on-line edge pixels which are not located within the predetermined distance;
   a second edge pixel detector for detecting second edge pixels located between two of the on-line edge pixels, when any one of the non-on-line edge pixels is between two of the on-line edge pixels; and
   a determining module for determining whether a non-on-line edge pixel represents a document edge or not, based on whether or not the two on-line edge pixels are connected by the second edge pixels via the non-on-line edge pixel.

2. The image processing apparatus according to claim 1, wherein the second edge pixel detector repeatedly performs processing for detecting a second edge pixel by performing a search within a predetermined range from one of the two on-line edge pixels and for detecting a next second edge pixel by further performing a search within a predetermined range from the detected second edge pixel, and
   wherein the determining module determines that the two on-line edge pixels are connected by the second edge pixels via the non-on-line edge pixel, when the other of the two on-line edge pixels is located within a predetermined range of any one of the second edge pixels detected within a predetermined number of times.

3. The image processing apparatus according to claim 2, wherein the second edge pixel detector calculates a pixel value difference between each pixel detected within the predetermined range and each pixel located adjacent to the detected pixel, and detects a pixel a pixel value difference of which is the largest within the predetermined range as the second edge pixel.

4. The image processing apparatus according to claim 3, wherein the second edge pixel detector assigns a weight value to the pixel value difference according to a direction in which the second edge pixel was detected, for all pixels located within a predetermined range from the detected second edge pixel, and detects a pixel, a weighted pixel value difference of which is the largest, as the second edge pixel.

5. The image processing apparatus according to claim 1, wherein the determining module determines that the second edge pixel also represents a document edge when it is determined that the non-on-line edge pixel represents a document edge.

6. The image processing apparatus according to claim 1, wherein the determining module determines that pixels lying on a straight line joining the two on-line edge pixels represent a document edge when two of the on-line edge pixels detected for one straight line detected by the straight line detector cannot be connected by the second edge pixels via the non-on-line edge pixel.

7. The image processing apparatus according to claim 1, wherein the determining module determines that pixels lying on a straight line joining an intersection of the two straight lines to each one of two of the on-line edge pixels represent a document edge when the two on-line edge pixels respectively detected for two straight lines detected by the straight line detector cannot be connected by the second edge pixels via the non-on-line edge pixel.

8. The image processing apparatus according to claim 1, further comprising a correction module for correcting pixels located between the straight line detected by the straight line detector and the non-on-line edge pixel determined to represent the document edge, by using the non-on-line edge pixel or using pixels located on a side of the non-on-line edge pixel opposite from the straight line, and for correcting pixels located between the straight line detected by the straight line detector and the second edge pixels determined to represent the document edge, by using the second edge pixels or using pixels located on a side of the second edge pixels opposite from the straight line.

9. The image processing apparatus according to claim 8, wherein the correction module corrects pixels located between the straight line detected by the straight line detector and the on-line edge pixels, by using the on-line edge pixels or using pixels located on a side of the on-line edge pixels opposite from the straight line.

10. An image processing method comprising:
   detecting a plurality of first edge pixels from an input image;
   detecting a straight line from the plurality of first edge pixels;
   classifying the plurality of first edge pixels into on-line edge pixels which are located within a predetermined distance from the straight line and non-on-line edge pixels which are not located within the predetermined distance;
   detecting second edge pixels located between two of the on-line edge pixels when any one of the non-on-line edge pixels is between two of the on-line edge pixels; and
   determining, by a computer, whether a non-on-line edge pixel represents a document edge or not, based on whether or not the two on-line edge pixels are connected by the second edge pixels via the non-on-line edge pixel.

11. A computer-readable, non-transitory medium storing a computer program, wherein the computer program causes a computer to execute a process, the process comprising:
   detecting a plurality of first edge pixels from an input image;
   detecting a straight line from the plurality of first edge pixels;
   classifying the plurality of first edge pixels into on-line edge pixels which are located within a predetermined distance from the straight line and non-on-line edge pixels which are not located within the predetermined distance;
   detecting second edge pixels located between two of the on-line edge pixels when any one of the non-on-line edge pixels is between two of the on-line edge pixels; and
   determining whether a non-on-line edge pixel represents a document edge or not, based on whether or not the two on-line edge pixels are connected by the second edge pixels via the non-on-line edge pixel.

\* \* \* \* \*